3,398,094
VISCOUS AQUEOUS SOLUTION
Paul E. Blatz, Laramie, Wyo., and Sherrod A. Williams, Jr., Dallas, Tex., assignors to Mobil Oil Corporation, a corporation of New York
No Drawing. Filed Dec. 14, 1964, Ser. No. 418,326
20 Claims. (Cl. 252—8.55)

ABSTRACT OF THE DISCLOSURE

This specification discloses a viscous aqueous solution and uses therefor, the viscous aqueous solution being prepared by dissolving a first water-soluble polymer and a second water-soluble polymer in water to form an interaction product and to produce a more viscous solution than either of the polymers alone produce at the same concentration. The first water-soluble polymer is either a sulfonated poly-(2,6-dialkyl phenol) or its water-soluble salts. The alkyl groups therein are either methyl, ethyl, or normal propyl. The second water-soluble polymer is either poly-(N-vinyl-2-pyrrolidone); poly-(N-vinyl-5-R-2-oxazolidinone) where R is either a hydrogen, a methyl group, or an ethyl group. The first water-soluble polymer and the second water-soluble polymer have molecular weights of at least about 10,000 and are present in a total concentration of at least 0.01 percent by weight of the solution. Polymers having a molecular weight above 10,000 produce somewhat greater viscosities at the same concentration.

---

The viscous aqueous solutions may be employed in a wide variety of applications such as: (1) waterflooding to recover oil from a subterranean formation, (2) formulation of cosmetics, (3) fire fighting, (4) suppression of friction loss in turbulent flow through conduits, and (5) formulation of water-based paints.

This invention relates to a viscous aqueous solution. It relates more particularly to an aqueous solution thickened by a polymeric interaction product.

The viscous aqueous solutions of the present invention are formed by interacting in water a water-soluble sulfonated poly-(2,6-dialkyl phenol) or its water-soluble salts with a water-soluble poly-(N - vinyl-2-pyrrolidone) or poly-(N-vinyl-5-R-2-oxazolidinone) where R is either hydrogen, a methyl group, or an ethyl group. The interaction of the compounds produces an aqueous solution having a viscosity many times that of a solution of either of the compounds alone.

The sulfonated poly-(2,6-dialkyl phenol) employed in the invention is composed of repeating monomeric units having the structural Formula 1 shown below:

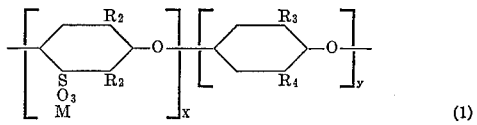

(1)

In this formula, $R_1$, $R_2$, $R_3$, and $R_4$ are alkyl groups containing 1 to 3 carbon atoms, inclusive, in a straight chain; namely, a methyl group, an ethyl group, or a normal propyl group. The two alkyl groups are in the two and six positions on the phenol nucleus, respectively, while the sulfonate group is in the three position on the phenol nucleus. M is a cation and can be hydrogen, ammonium, or any metal which will replace hydrogen and produce a water-soluble polymer, e.g., lithium, sodium, potassium, rubidium, cesium, calcium, strontium, barium, or magnesium. Further, in the formula, $x$ is the number of sulfonated dialkyl phenol monomer units in the polymer and $y$ is the number of unsulfonated dialkyl phenol monomer units in the polymer. The degree of sulfonation is defined as the fraction $$\frac{x}{x+y}$$

and is discussed hereinafter.

The water-soluble sulfonated poly-(2,6-dialkyl phenol) is prepared by a procedure in which, as a first step therein, the dialkyl phenol monomer is polymerized. In this first step, pyridine is added to a suitable solvent for the dialkyl phenol monomer. Suitable solvents include benzene and nitrobenzene. The pyridine acts as a ligand in the polymerization reaction. Cuprous chloride is also added to the solvent. These materials may be employed in the proportion of 90 milliliters of pyridine, 300 milliliters of solvent, and 0.4 gram of cuprous chloride. An oxygen-containing gas is then bubbled through the mixture to convert the cuprous chloride to cupric chloride. The cupric chloride reacts with the pyridine to form a complex which acts as a catalyst for the polymerization reaction. Thereafter, the monomeric 2,6-dialkyl phenol is added to the solution. The monomer may be added in the proportion of about 10 grams to a solution having the composition given above. The oxygen-containing gas is again passed through the reaction mixture to effect polymerization of the monomer. Passage of oxygen is continued until the desired degree of polymerization is effected.

After the desired degree of polymerization is effected, the polymerization reaction is terminated by discontinuing the supply of oxygen-containing gas to the reaction mixture. The pyridine is then removed from the reaction mixture. Removal may be carried out by distilling the pyridine from the reaction mixture. Alternatively, the pyridine can be removed by precipitation in the form of pyridine sulfate by adding sulfuric acid to the reaction mixture.

The polymerization of the 2,6-dialkyl phenol monomer can be carried out to effect, within limits, any desired degree of polymerization. For example, the polymerization can be carried out to effect polymerization such that the polymer contains about 1,500 or more monomer units. On the other hand, the polymerization can be carried out to produce a polymer having a lower molecular weight. For example, polymerization can be carried out such that the polymer contains from about 50 to about 1,000 monomer units.

The degree of polymerization can be controlled by control of the concentration of various of the components added to the reaction mixture. Control of the concentration of the cuprous chloride will control the degree of polymerization. For example, increasing the concentration of cuprous chloride will effect an increase in the molecular weight of the polymer. Additionally, the degree of polymerization can be controlled by control of the amount of the monomer added to the reaction mixture. Further, increase in the ratio of the amount of ligand, namely, the pyridine, to the amount of monomer added to the reaction mixture increases the degree of polymerization.

The degree of polymerization is not affected to any great extent by the type of oxygen-containing gas employed. It has been theorized that the polymerization of the monomer is brought about by an oxidative coupling. Regardless of the theory, oxygen must be present in the reaction mixture during the polymerization reaction. The oxygen maintains the copper chloride in the cupric form, as mentioned before, and in accordance with the theory effects the oxidative coupling. The oxygen-containing gas employed may consist entirely of oxygen. However, the oxygen-containing gas may be air.

Sulfonation of the polymer can be effected following removal of the pyridine from the reaction mixture. Sulfonation is carried out by adding a sulfonating agent to the reaction mixture. In carrying out the sulfonation reaction, any of the known sulfonating agents may be employed. For example, the reaction may be carried out by employing sulfuric acid, fuming sulfuric acid (oleum), chlorosulfonic acid, or sulfur trioxide. Preferably, chlorosulfonic acid is employed.

The sulfonation reaction proceeds until such time that the sulfonated polymer precipitates from the reaction mixture. Stated otherwise, precipitation of the sulfonated polymer terminates the sulfonation reaction. Thus, the sulfonated product will ordinarily be uniform under any given set of reaction conditions. Further, sulfonation leads to a product which is readily water soluble when cross-linking of the polymer does not occur to any great extent. Cross-linking is the reaction of the water-solubilizing sulfonate group to form a sulfone linkage between polymer chains, thus decreasing water solubility of the product.

The sulfonation reaction may be carried out at room temperature or may be carried out at lower temperatures. Thus, the reaction may be carried out at temperatures of about 25° C. or may be carried out at temperatures as low as about 0° C.

Satisfactory sulfonation is effected by carrying out the reaction at atmospheric pressure. Sulfonation may also be effected at higher or lower pressures.

The time during which the sulfonation reaction is carried out is not of importance. As stated hereinabove, the reaction continues until such time that the sulfonated polymer precipitates. At this stage, the reaction terminates automatically.

The degree to which the polymer is sulfonated is susceptible to control. Sulfonation may be effected to obtain a degree of sulfonation of 1.0. Stated otherwise, the sulfonation can be controlled such that each unit of monomer in the polymer contains one sulfonic acid radical, namely ($-SO_3H$). The sulfonation may also be effected to obtain a degree of sulfonation less than 1.0. It is preferred that the degree of sulfonation be at least 0.2 in order to assure water solubility. Also, it is preferred that the degree of sulfonation be no greater than about 0.67 to obtain a more nearly uniform polymer having no cross-linking. Generally, the degree of sulfonation is controlled by proportioning the amount of sulfonating agent with respect to the amount of polymer in the reaction mixture. Thus, higher degrees of sulfonation are obtained by increasing the ratio of the amount of sulfonating agent to the amount of poly-(2,6-dialkyl phenol) in the reaction mixture. On the other hand, the reaction is not stoichiometric and, accordingly, the degree of sulfonation will not correspond precisely to the molecular ratio of sulfonating agent to that of polymer. Where the desired degree of sulfonation is about 0.6, satisfactory results are obtained employing twice the stoichiometric amount of sulfonating agent.

The acid form of sulfonated poly-(2,6-dialkyl phenol) can be converted to any of various salts. Conversion can be effected by reacting the acid form of the polymer with a compound, such as a metallic hydroxide, containing as a cation a metal capable of replacing the hydrogen ion of the acid form. Thus, the acid form of the sulfonated polymer can be converted to an alkali metal salt, an alkaline earth metal salt, or an ammonium salt. Accordingly, the sulfonated polymer can be obtained in the form of its sodium, potassium, rubidium, cesium, lithium, calcium, strontium, barium, magnesium, or ammonium salts. From the standpoint of economy, the sodium salt is to be preferred to other alkali metal salts. Further, the calcium salt is to be preferred to other alkaline earth metal salts.

In the practive of the invention, the sulfonated poly-(2,6-dialkyl phenol) may have a molecular weight of as low as about 5,000. Preferably, however, a higher molecular weight of the sulfonated polymer is employed. Thus, for example, it is preferred that the molecular weight be at least about 20,000. Satisfactory results are obtained when the molecular weight of polymer employed is between about 40,000 and about 100,000. Satisfactory results are also obtained when the molecular weight of the polymer is about 150,000. Higher molecular weights of the polymer may also be employed. The same concentration of higher molecular weight sulfonated poly-(2,6-dialkyl phenol) produces greater thickening of the viscous aqueous solutions in which they are dissolved than does lower molecular weight polymer.

The water-soluble poly-(N-vinyl-2-pyrrolidone)s are composed of repeating monomeric units having the structural Formula 2 shown below:

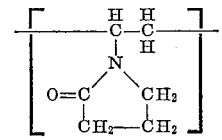

(2)

These polymers are commercially available and their name is often abbreviated to PVP. Different average molecular weight polymers are commercially available under Fikentscher K number designations. The Fikentscher K number is described in an article by H. Fikentscher appearing in Cellulosechemie, vol. 13, p. 58, 1932. Two grades of PVP which are readily available and are identified by their Fikentscher K number are K–90 and K–60. PVP K–90 has a number average molecular weight, i.e., a molecular weight determined by the average number of monomer units in the polymer, of about 360,000. PVP K–60 has a number average molecular weight of about 160,000. A number average molecular weight, such as determined by osmotic pressure, for example, may be slightly lower than a weight average molecular weight such as determined by light scattering.

In the practice of the invention, the poly-(N-vinyl-2-pyrrolidone) may have a molecular weight of as low as about 10,000. Preferably, however, a higher molecular weight polymer is employed. Thus, for example, it is preferred that the molecular weight be at least about 100,000. Satisfactory results are obtained when the molecular weight of the polymer employed is from about 150,000 to about 400,000. Higher molecular weights of the polymer may also be employed. The same concentration of higher molecular weight poly-(N-vinyl-2-pyrrolidone) produces greater thickening of the viscous aqueous solutions in which it is dissolved than does lower molecular weight polymer.

The water-soluble poly-(N-vinyl-5-R-2-oxazolidinone)s are composed of repeating monomeric units having the structural Formula 3 shown below:

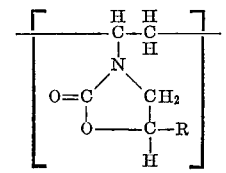

(3)

where R is either hydrogen, a methyl group, or an ethyl group. The water-soluble poly-(N-vinyl-5-R-2-oxazolidinone)s are also obtainable from commercial sources. For example, poly-(N-vinyl-5-methyl-2-oxazolidinone), the name for which is abbreviated PVOM, is available from the Dow Chemical Company, Plastics Production Department, Midland, Michigan. Two grades of PVOM which are available and identified by their Fikentscher K number are K–90 and K–60. PVOM K–60 has a molecular weight of about 150,000; PVOM K–90, about 340,000. They may be prepared by the reaction of propylene oxide and urea, followed by ring closure and vinylation. Similarly, poly-(N-vinyl-2-oxazolidinone), the name for which is abbreviated PVO, may be prepared by the reaction of ethylene oxide and urea, followed by ring closure and vinylation. In like manner, poly - (N - vinyl-5-ethyl-2- oxazolidinone), the name for which is abbreviated PVOE, may be prepared by the reaction of butylene oxide and urea, followed by ring closure and vinylation.

In the practice of the invention, the poly-(N-vinyl-5-R-2-oxazolidinone) may have a molecular weight of as low as about 10,000. Preferably, however, a higher molecular weight polymer is employed. Thus, for example, it is preferred that the molecular weight be at least about 100,000. Satisfactory results are obtained when the molecular weight of the polymer employed is from about 150,000 to about 400,000. Higher molecular weights of the polymer may also be employed. The same concentration of higher molecular weight poly - (N - vinyl-5-R-2-oxazolidinone) produces greater thickening of the viscous aqueous solutions in which it is dissolved than does lower molecular weight polymer.

If desired, the viscous solution may contain all three polymers, i.e., the sulfonated poly-(2,6-dialkyl phenol), the poly-(N-vinyl-2-pyrrolidone) and the poly-(N-vinyl-5-R-2-oxazolidinone).

The total concentration of the water-soluble polymers incorporated in the aqueous solution will depend upon the viscosity desired. The viscosity desired depends, in turn, upon the application of the viscous aqueous solution. Employing higher concentrations of polymer results in higher viscosities of the aqueous solution. Generally, the concentration will be from 0.01 to 5.0 percent by weight. A critical concentration of 0.01 percent by weight of polymers must be in the solution in order to obtain the synergistic thickening which characterizes the invention. Preferably, a concentration of at least 0.025 percent by weight is employed. The upper limit of concentration is determined by economic considerations as well as the type of application. At concentrations greater than about 1.0 percent by weight, the solutions become very viscous. At concentrations greater than about 2.0 percent by weight, extremely high viscosities are obtained and the solutions resemble gels.

The amount of each of the individual polymers which should be present in the solution is dependent upon the total amount of the polymers. With adequate total concentration, useful synergistic thickening occurs when the two polymers are in the solution in almost any proportion. However, the thickening is appreciably greater when the sulfonated poly-(2,6-dialkyl phenol), or its soluble salts, is employed in a ratio by weight of from 4:1 to 1:4 relative to the poly-(N-vinyl-2-pyrrolidone) or the poly-(N-vinyl-5-R-2-oxazolidinone). Preferably, a ratio of from 2:1 to 1:2 is employed since the greatest thickening occurs within this range.

The viscous aqueous solutions such as formed by the interaction product between the water-soluble polymers described hereinbefore are useful in numerous applications. The viscous solutions may contain other materials appropriate to the particular application.

One of the most significant applications for the viscous aqueous solutions is in the production of oil from a subterranean formation. In this application, the solution is injected as a slug through an injection well into the oil-containing subterranean formation to help produce oil therefrom. As is well known, the oil accumulated in subterranean formations is produced through wells drilled thereinto. After the first stage of production is completed, often referred to as primary depletion, much oil remains, in the subterranean formation. One of the most widely used techniques to attempt to recover this remaining oil is the injection of a fluid through one of the wells, which has been called an injection well, and into the formation. Oil is displaced from within the formation by the injected fluid and may be produced through another of the wells, called a production well. The fluid which is injected through the injection well and into the formation tends to develop fingers and to flow more readily through the more permeable sections of the subterranean formation. As a result, the injected fluid breaks through, i.e., is produced, at the production well before the desired amount of oil has been displaced from within the subterranean formation and produced at the production well. As has been described in numerous publications and patents, the mobility of a slug of viscous water more nearly matches the mobility of the oil in the formation and enables the recovery of a greater percentage of the oil before this breakthrough of the injected fluid occurs at the production well. This is particularly advantageous when the injected fluid is water as is used in waterflooding a subterranean formation. When the viscous aqueous solution of the invention is used in this application, a total polymer concentration of from 0.01 to 1.0 percent is adequate. Preferably, a polymer concentration of from 0.025 to 0.5 percent by weight is employed.

Another application of the viscous aqueous solution of the invention is in cosmetic formulations. When used in cosmetic formulations, it may be desirable to use concentrations between about 1.0 and about 5.0 percent by weight of the polymer in the aqueous solution.

Other applications of the viscous aqueous solution of the invention include: (1) fire fighting wherein a concentration of between 0.01 and 1.0 percent by weight of the polymer is added to the water being flowed through the fire hoses and fire nozzles, (2) the suppression of friction loss in turbulent flow through conduits, and (3) water-based paint formulations.

As mentioned previously, when either poly-(N-vinyl-2-pyrrolidone) or poly-(N-vinyl-5-methyl-2-oxazolidinone) is incorporated, together with sulfonated poly-(2,6-dialkyl phenol) or its water-soluble salts, in water, the resulting aqueous solution exhibits a viscosity that is considerably greater than the viscosity of the solution resulting when either polymer is added in the same concentration to water. In other words, there is a synergistic effect on the viscosity realizable by adding the two types of polymers to an aqueous system. This synergistic thickening effect suggests an interaction, in solution, between the two polymers to form an interaction product. The following examples will illustrate the invention.

EXAMPLE 1

In this example, eight solutions were prepared by dissolving 0.5 percent by weight of total polymer in water. In one solution, the total polymer consisted of sodium poly - (2,6 - dimethyl phenol) sulfonate, abbreviated SPDMPS. The SPDMPS had a number average molecular weight of approximately 40,000 and a degree of sulfonation of about 0.6. In another solution, the total polymer consisted of poly-(N-vinyl-2-pyrrolidone) K–90, abbreviated PVP K–90, and having a number average molecular weight of about 360,000 as noted and described hereinbefore. In the remaining six solutions, the total polymer consisted of various weight fractions of the respective polymers as shown in columns 1 and 2 in Table I. The viscosity in centipoises of each of these eight solutions was measured at 30° C. and 3.3 seconds$^{-1}$ with a Couette-type viscometer, the U.L. adapter on a Brookfield LVT Synchro-Lectric Viscometer having variable rate of rotation. The respective viscosities are set forth in column 3 in Table I.

TABLE I

| Weight Fraction of Polymer in Mixture | | Viscosity (cps.) |
|---|---|---|
| SPDMPS | PVP K-90 | |
| 1.0 | 0 | 14.6 |
| 0.80 | 0.20 | 4 |
| 0.70 | 0.30 | 47 |
| 0.60 | 0.40 | 50 |
| 0.50 | 0.50 | 52 |
| 0.40 | 0.60 | 48 |
| 0.20 | 0.80 | 33 |
| 0.0 | 1.0 | 2.8 |

Referring to Table I, the data show that each solution of the respective mixtures of polymers, wherein either polymer is in a ratio of from 4:1 to 1:4 with respect to the other polymer, was several times more viscous than the solution of either polymer alone. The most viscous solution was produced by the mixture containing equal weights of each polymer.

EXAMPLE 2

In this example, six solutions were prepared by dissolving 0.15 percent by weight of total polymer in water. In one solution, the total polymer consisted of hydrogen poly - (2,6 - dimethyl phenol) sulfonate, abbreviated HPDMPS. The HPDMPS had a number average molecular weight of approximately 40,000 and a degree of sulfonation of about 0.6. In another solution, the total polymer consisted of the PVP K–90 described in Example 1. In the remaining four solutions, the total polymer consisted of various weight fractions of the respective polymers as shown in columns 1 and 2 in Table II. The viscosity in centipoises of each of these six solutions was measured at 30° C. and 3.3 seconds$^{-1}$ with the same Couette-type viscometer used in Example 1. The respective viscosities are set forth in column 3 in Table II.

TABLE II

| Weight Fraction of Polymer in Mixture | | Viscosity (cps.) |
| --- | --- | --- |
| HPDMPS | PVP K–90 | |
| 1.0 | 0 | 5.2 |
| 0.8 | 0.2 | 46 |
| 0.6 | 0.4 | 120 |
| 0.5 | 0.5 | 140 |
| 0.4 | 0.6 | 124 |
| 0 | 1.0 | 1.2 |

Referring to Table II, the data show that each solution of the respective mixtures of polymers wherein either polymer is in a ratio of from 4:1 to 1:4 with respect to the other polymer, was many times more viscous than the solution of either polymer alone. Again, the most viscous solution was produced by the mixture containing equal weights of each polymer. The data also show that the solutions are much more viscous with the hydrogen poly-(2,6-dimethyl phenol) sulfonate than with sodium poly-(2,6-dimethyl phenol) sulfonate, even though a lower total concentration of polymer was used in the solutions employing hte HPDMPS.

EXAMPLE 3

In this example, five solutions were prepared by dissolving 0.3 percent by weight of total polymer in water. In one solution, the total polymer consisted of the HPDMPS described in Example 2. In another solution, the total polymer consisted of poly-(N-vinyl-2-pyrrolidone) K–60, abbreviated PVP K–60, and having a number average molecular weight of about 160,000 as noted and described hereinbefore. In the remaining three solutions, the total polymer consisted of various weight fractions of the respective polymers as shown in columns 1 and 2 in Table III. The viscosity in centipoises of each of these five solutions was measured at 30° C. and 3.3 seconds$^{-1}$ with the same Couette-type viscometer used in Example 1. The respective viscosities are set forth in column 3 in Table III.

TABLE III

| Weight Fraction of Polymer in Mixture | | Viscosity (cps.) |
| --- | --- | --- |
| HPDMPS | PVP K–60 | |
| 1.0 | 0 | 6.6 |
| 0.6 | 0.4 | 22 |
| 0.5 | 0.5 | 34 |
| 0.4 | 0.6 | 36 |
| 0 | 1.0 | 1.0 |

Referring to Table III, the data show that each solution of the respective mixtures of polymers was several times more viscous than was the solution of either polymer alone. The most viscous solution was produced by the mixture containing a weight ratio of about 4 parts HPDMPS to about 6 parts PVP K–60. The data also indicate that lower viscosities were produced when the lower molecular weight PVP K–60 was used in the solutions than when the higher molecular weight PVP K–90 was used, shown in Table II. This is especially significant because the viscosities shown in Table III were measured in solutions employing a total polymer concentration of 0.3 percent; whereas, the viscosities in Table II were measured in solutions employing a total polymer concentration of 0.15 percent by weight.

EXAMPLE 4

In this example, six solutions were prepared by dissolving 0.5 percent by weight of total polymer in water. In one solution, the total polymer consisted of the SPDMPS described in Example 1. In another solution, the total polymer consisted of poly-(N-vinyl-5-methyl-2-oxazolidinone) K–60, abbreviated PVOM K–60, and having a molecular weight of about 150,000 as noted and described hereinbefore. In the remaining four solutions, the total polymer consisted of various weight fractions of the respective polymers as shown in columns 1 and 2 of Table IV. The viscosity in centipoises of each of these six solutions was measured at 30° C. and 3.3 seconds $^{-1}$ with the same Couette-type viscometer used in Example 1. The respective viscosities are set forth in column 3 in Table IV.

TABLE IV

| Weight Fraction of Polymer in Mixture | | Viscosity (cps.) |
| --- | --- | --- |
| SPDMPS | PVOM K–60 | |
| 1.0 | 0 | 14.6 |
| 0.6 | 0.4 | 27. |
| 0.5 | 0.5 | 33 |
| 0.4 | 0.6 | 44 |
| 0.3 | 0.7 | 24 |
| 0 | 1.0 | 1.2 |

Referring to Table IV, the data show that each solution of the respective mixtures of polymers was more viscous than was the solution of either polymer alone. The most viscous solution was produced at a weight ratio of about 4 parts of SPDMPS to about 6 parts of PVOM K–60.

EXAMPLE 5

In this example, five solutions were prepared by dissolving 0.3 percent by weight of total polymer in water. In one solution, the total polymer consisted of the HPDMPS described in Example 2. In another solution, the total polymer consisted of the PVOM K–60 described in Example 4. In the remaining three solutions, the total polymer consisted of various weight fractions of the respective polymers as shown in columns 1 and 2 of Table V. The viscosity in centipoises of each of these five solutions was measured at 30° C. and 3.3 seconds $^{-1}$ with the same Couette-type viscometer used in Example 1. The respective viscosities are set forth in column 3 in Table V.

TABLE V

| Weight Fraction of Polymer in Mixture | | Viscosity (cps.) |
| --- | --- | --- |
| HPDMPS | PVOM K–60 | |
| 1.0 | 0 | 6.6 |
| 0.60 | 0.40 | 22 |
| 0.50 | 0.50 | 34 |
| 0.40 | 0.60 | 36 |
| 0 | 1. | 1 |

Referring to Table V, the data show that each solution of the respective mixtures of polymers was several times more viscous than was the solution of either polymer alone. The most viscous solution was produced at a weight ratio of about 4 parts of HPDMPS to about 6 parts of PVOM K–60.

As noted hereinbefore, a more viscous aqueous solution is produced by increasing the total concentration of the same polymers in the same proportion. This can be seen in the foregoing examples and their respective tables of data. It is shown in Table VI wherein viscosity data are tabulated for solutions of the pure polymers, PVP K-90 and HPDMPS, and of a 1:1 mixture of the polymers at different concentrations.

TABLE VI

| Concentration | Viscosity Data in Centipoises | | |
| --- | --- | --- | --- |
| | PVP K-90 | HPDMPS | Mixture |
| 0.0 | 1.0 | 1.6 | 1.8 |
| 0.025 | 1.0 | 2.4 | 4.6 |
| 0.05 | 1.0 | 3.4 | 15.0 |
| 0.1 | 1.0 | 4.8 | 62.0 |

Having thus described the invention, it will be understood that such description has been given by way of illustration and example and not by way of limitation, reference for the latter purpose being had to the appended claims.

What is claimed is:

1. A viscous aqueous solution consisting essentially of water and an interaction product of:
    (a) a first water-soluble polymer selected from the class consisting of a sulfonated poly-(2,6-dialkyl phenol) and its water-soluble salts, wherein the alkyl group are in the two and six positions on the phenol nucleus and are selected from the class consisting of methyl, ethyl, and normal propyl; and
    (b) a second water-soluble polymer selected from the class consisting of poly-(N-vinyl-2-pyrrolidone) and poly-(N-vinyl-5-R-2-oxazolidinone) wherein R is selected from the class consisting of hydrogen, a methyl group, and an ethyl group;
said first polymer and said second polymer each having a molecular weight of at least about 10,000, the total concentration of said first polymer and said second polymer being at least 0.01 percent by weight of said solution, and said first polymer being in a concentration by weight based on the concentration of said second polymer of from 1:4 to 4:1.

2. The viscous solution of claim 1 wherein said sulfonated poly-(2,6-dialkyl phenol) has a molecular weight of from about 10,000 to about 150,000.

3. The viscous solution of claim 1 wherein said sulfonated poly-(2,6-dialkyl phenol) has a molecular weight of from about 20,000 to about 100,000.

4. The viscous solution of claim 1 wherein said sulfonated poly-(2,6-dialkyl phenol) has a degree of sulfonation of from 0.2 to 0.67.

5. The viscous solution of claim 1 wherein said sulfonated poly-(2,6-dialkyl phenol) is sulfonated poly-(2,6-dimethyl phenol).

6. The viscous solution of claim 5 wherein said sulfonated poly-(2,6-dimethyl phenol) contains a cation selected from the group consisting of $H^+$, $Na^+$, $K^+$, $Li^+$, $Rb^+$, $Ce^+$, $Ca^{++}$, $Ba^{++}$, $Mg^{++}$, $Sr^{++}$, and $NH_4^+$.

7. The viscous solution of claim 1 wherein said interaction product is formed by interaction of:
    (a) said first polymer, and
    (b) said poly-(N-vinyl-2-pyrrolidone).

8. The viscous solution of claim 7 wherein said first polymer is in a concentration by weight based on the concentration by weight of said poly-(N-vinyl-2-pyrrolidone) of from 1:2 to 2:1.

9. The viscous solution of claim 7 wherein said poly-(N-vinyl-2-pyrrolidone) has a molecular weight of from about 100,000 to about 400,000.

10. The viscous solution of claim 9 wherein said poly-(N-vinyl-2-pyrrolidone) has a molecular weight of from 160,000 to 360,000, inclusive.

11. The viscous solution of claim 1 wherein said interaction product is in a concentration of from about 0.01 to about 5.0 percent by weight, as determined by the total amount of said polymers added.

12. The viscous solution of claim 11 wherein said interaction product is in a concentration of from about 0.01 to about 1.0 percent by weight.

13. The viscous solution of claim 1 wherein said first water-soluble polymer is in a proportion with respect to said second water-soluble polymer of from 1:2 to 2:1.

14. The viscous solution of claim 1 wherein said first water-soluble polymer has a molecular weight of from about 10,000 to about 150,000 and said second water-soluble polymer has a molecular weight of from about 100,000 to about 400,000.

15. The viscous solution of claim 14 wherein said first water-soluble polymer has a molecular weight of from about 20,000 to about 100,000.

16. The viscous aqueous solution of claim 1 wherein said interaction product is formed by interaction of:
    (a) said first polymer, and
    (b) said poly-(N-vinyl-5-R-2-oxazolidinone).

17. The viscous solution of claim 16 wherein said first polymer is in a concentration by weight based on the concentration by weight of poly-(N-vinyl-5-R2-oxazolidinone) of from 1:2 to 2:1.

18. The viscous solution of claim 16 wherein said poly-(N-vinyl-5-R-2-oxazolidinone) has a molecular weight of from about 100,000 to about 400,000.

19. The viscous solution of claim 18 wherein said poly-(N-vinyl-5-R-2-oxazolidinone) has a molecular weight of from about 150,000 to about 340,000, inclusive.

20. In a method for the recovery of oil from an oil-containing subterranean formation wherein a fluid is injected into an injection well penetrating said formation and oil is produced from a production well penetrating said formation, the improvement comprising injecting through said injection well and into said formation a viscous aqueous solution consisting essentially of water having incorporated therein a total polymer concentration of from about 0.01 to about 1.0 percent by weight of:
    (a) a first water-soluble polymer selected from the class consisting of a sulfonated poly-(2,6-dialkyl phenol), and its water-soluble salts, wherein the alkyl groups are in the two and six positions on the phenol nucleus and are selected from the class consisting of methyl, ethyl, and normal propyl; and
    (b) a second water-soluble polymer selected from the class consisting of poly-(N-vinyl-2-pyrrolidone) and poly-(N-vinyl-5-R-2-oxazolidinone) wherein R is selected from the group consisting of hydrogen, a methyl group, and an ethyl group;
said first polymer and said second polymer each having a molecular weight of at least about 10,000, and said first polymer being in a ratio by weight of from about 1:4 to about 4:1 based on the concentration by weight of said second polymer incorporated in said water.

References Cited

UNITED STATES PATENTS

| 2,265,450 | 12/1941 | Reppe et al. | 260—88.3 |
| 3,179,171 | 4/1965 | Beale | 252—8.55 |
| 3,302,716 | 2/1967 | Williams | 252—8.5 |
| 3,308,883 | 3/1967 | Foster | 252—8.55 |

LEON D. ROSDOL, *Primary Examiner.*

HERBERT B. GUYNN, *Assistant Examiner.*

UNITED STATES PATENT OFFICE
CERTIFICATE OF CORRECTION

Patent No. 3,398,094                                         August 20, 1968

Paul E. Blatz et al.

It is certified that error appears in the above identified patent and that said Letters Patent are hereby corrected as shown below:

Column 1, line 31, cancel the black line indicating the end of the Abstract of the Disclosure and insert the same between lines 37 and 38; line 53, at the top of the first benzene ring, "$R_2$" should read -- $R_1$ --. Column 3, line 71, "practive" should read -- practice --. Column 6, TABLE I, third column, line 2 thereof, "4" should read -- 42 --. Column 7, line 42, "hte" shou[ld] read -- the --; same column 7, TABLE III, second column, in the heading, line 2 thereof, "PVP K-90" should read -- PVP K-60 --. Column 8, TABLE IV, third column, line 2 thereof, "27." should read -- 27.4 --; same column 8, TABLE V, second column, line 5 thereof, "1." should read -- 1.0 --. Column 9, TABLE VI, first column, line 1 thereof, "0.0" should read -- 0.01 --; same column 9, line 24, "group" should read -- groups --. Column 10, line 25, "poly-(N-vinyl-5-R2-oxazoli-" should read -- poly-(N-vinyl-5-R-2-oxazoli- --.

Signed and sealed this 13th day of January 1970.

(SEAL)
Attest:

EDWARD M. FLETCHER, JR.                       WILLIAM E. SCHUYLER, JR.
Attesting Officer                                      Commissioner of Patents